UNITED STATES PATENT OFFICE.

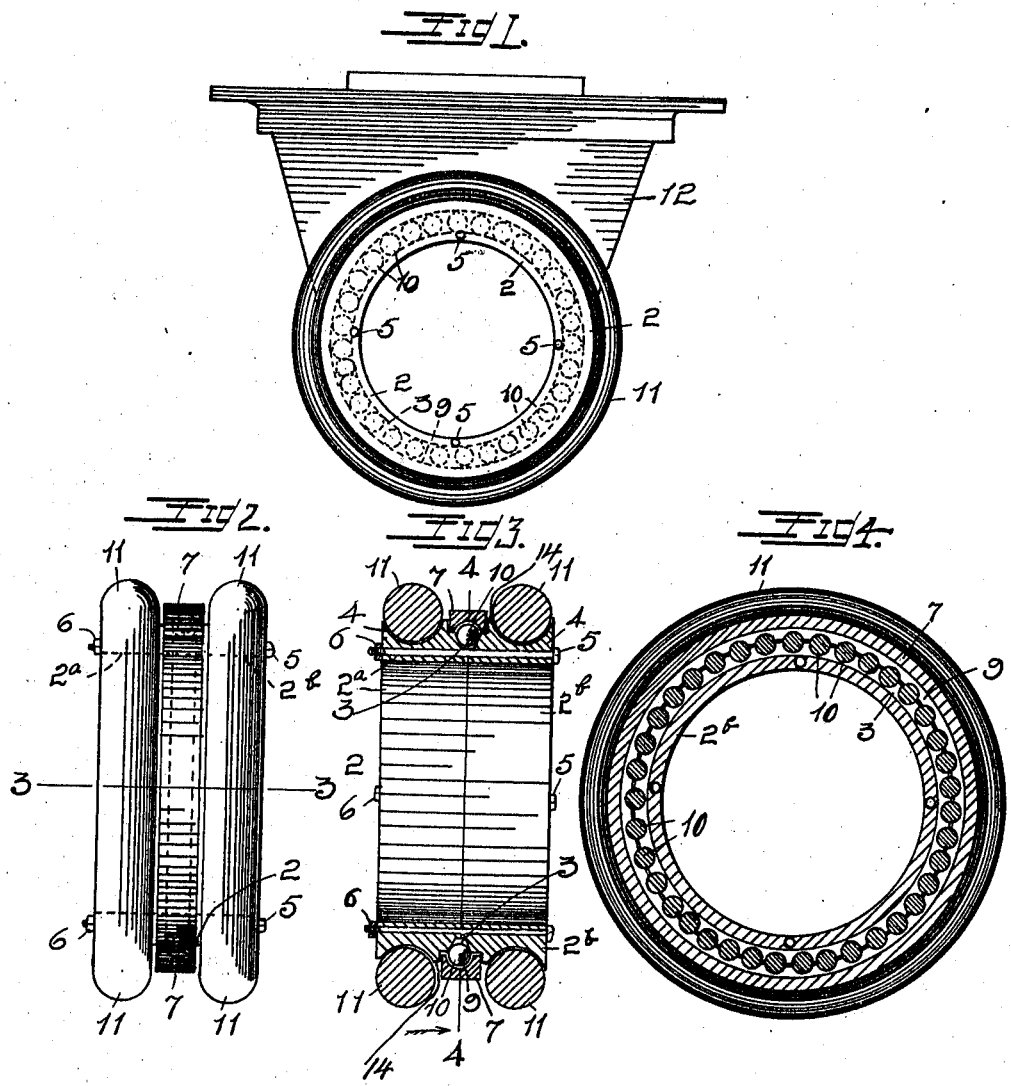

JOSEPH W. HOLMES, OF GALESBURG, ILLINOIS.

WHEEL.

978,161.  Specification of Letters Patent.  Patented Dec. 13, 1910.

Application filed May 14, 1910. Serial No. 561,463.

*To all whom it may concern:*

Be it known that I, JOSEPH W. HOLMES, a citizen of the United States, and a resident of Galesburg, in the county of Knox and State of Illinois, have invented a new and useful Wheel, of which the following is a specification.

The invention has relation to ground or supporting-wheels, the particular class of which will be hereinafter more fully disclosed.

An object of the invention is to provide a ground or supporting-wheel which requires no axle, which is devoid of both hub and spokes or the like, and which when employed as a caster-wheel, as hereinafter described, will be free from certain objectionable features heretofore present in such wheels.

It is another object to provide a ground or supporting-wheel the weight-bearing surface of which is provided by a bearing-ring or annulus supported substantially on its periphery.

It is also an object to provide a great weight-bearing surface.

Another object is to minimize the friction created by the vehicle or other means supported by the wheel or wheels.

To provide a wheel which will practically eliminate skidding constitutes another object.

A still further object is to adapt the improvements to devices differing largely in their character and application, as will presently be set forth.

To provide a wheel which, when used as a vehicle wheel, will obviate much of the jarring and jolting occasioned by ordinary types of wheels constitutes another object.

That the mechanism constituting the means above recited be durable, strong and simple, is a prime requisite, and to provide such means for carrying out these ends constitutes still another object.

Minor objects will be in part obvious and in part pointed out.

I desire that the terms "ground wheel" and "supporting wheel" herein used be understood to comprehend only such wheels as are adapted to roll upon the ground or other surface and to support or carry the vehicle, bracket, table or other thing which surmounts them—in other words, such wheels as carry the weight of the article or thing which is above them. The invention does not comprehend such wheels as are journaled upon a shaft or an axle, as idler wheels, pulley wheels, and the like.

Mechanism showing the preferred structural features, arrangement, connection and the mutual relationship of the several elements constituting my improvement, is illustrated in the accompanying drawing, in which:—

Figure 1 is a side elevation showing an arched bracket supported on a wheel embodying my improvements; Fig. 2, a front elevation; Fig. 3, a transverse vertical central section in the line 3—3 in Fig. 2; and Fig. 4, a longitudinal vertical central section in the line 4—4 in Fig. 3, but showing the entire wheel. Figs. 2, 3, and 4 are slightly enlarged with reference to Fig. 1.

Like reference numerals refer to the same part in the different figures of the drawing.

2 indicates a ring or annulus which for the purposes hereof I shall term the rim, inasmuch as it performs at least one of the functions of an ordinary wheel-rim—*i. e.*, it supports the tire. It is provided with a centrally disposed annular race or channel 3, and at each side thereof and adjacent thereto it is grooved to provide tire-channels 4. Both the race and the tire-channels may be of any desired and suitable configuration. I have shown the rim as composed of two like parts, 2$^a$ and 2$^b$, said parts secured firmly together by bolts 5 and nuts 6. Any other securing means may be employed if preferred. It will be evident also that the rim may be integral if preferred, and the supporting band 7 now to be described slipped thereover, in which event the relative sizes must be slightly altered from those shown in the drawing herewith. Said supporting-band comprises an annulus having an internal annular channel or race 9 confronting or opposed to the race 3. While I have illustrated the band 7 as integral it will be apparent that it may be transversely divided if found preferable in certain cases, and the ends united in any suitable manner. In the drawing I have shown it as restrained from lateral movements by shoulders 14 rising from the race 3.

Disposed in the double race 3—9 are bearing balls 10 which perform their usual functions of minimizing friction. Rollers may be substituted therefor, and excellent results produced, and it may be here stated that for certain uses and purposes, as in building-moving apparatus, neither balls nor rollers are absolutely essential.

11—11 indicate tires seated in the channels 4. Being in pairs, they are preferably solid rather than pneumatic or hollow tires, and not only are they relatively inexpensive, but also there is less tire-friction, and the danger of lateral skidding is practically eliminated. Tires other than rubber, which are indicated, may be substituted therefor; indeed, the tires in small wheels, as casters, may be turned from the same piece of wood as is the rim, and be integral therewith.

Other than to state that the vehicle-frame, caster-frame, bracket, or other thing to which the supporting-band is to be attached, and which said band is adapted to support, may be secured thereto in any suitable manner (as by welding, bolting, etc.) it is unnecessary to herein enter into details. In all cases the fixed part, for instance the bracket or bolster 12, will bear upon the supporting-band 7, the race-walls of which at its upper portion will bear upon the balls 10 and these upon the walls of the race 3 in the rim 2.

In cotton and woolen mills, in upholstery shops and factories, large dress-making and tailoring establishments, laundries etc. much difficulty has been experienced by reason of threads, lint, clippings and the like collecting on the axles and in the bearings of the casters, (large numbers of which are employed,) where such waste, especially when saturated with the lubricating oil, forms a mass of such tenacity that the casters become useless until cleaned, and as this cleaning operation is a daily necessity and is difficult to perform, much labor and expense are entailed. A common method of cleaning such casters has been to burn off the threads and oil accumulation by means of a blast-lamp, which soon destroyed the casters. The wheel above described being devoid of both axle and bearing, this fault and expense are overcome.

I do not deem it necessary to enter more fully into a discussion or recital of the many purposes to which my improvements might be put or for which they are adapted.

To a certain extent the advantages of the present invention have been set forth in connection with the statement of the objects of the invention and the detail description thereof; concisely stated, however, the leading benefits secured thereby are as follows:—
First: The bearing is on the wheel-rim instead of on a spoke-supported hub. Second: There is no axle to break or "spring." Third: Danger of a hot box or journal is eliminated. Fourth: Friction is reduced to a minimum. Fifth: Danger of skidding is practically eliminated. Sixth: Cost of maintenance is reduced. Seventh: As a caster-wheel it eliminates the greatest item of expense, and its mode of operation is much superior. Eighth: It is adaptable for a great diversity of uses. Ninth: It seldom requires lubrication. Tenth: When used as a vehicle tire the double-bearing will cause it to run much smoother than does a single-bearing wheel, especially over inequalities in roads and pavements.

While I have illustrated and described a preferred embodiment of the invention it will be understood that without departing from the essential spirit and scope or sacrificing any of the advantages thereof, it is susceptible of various changes in details of construction, the coöperation, the combination, and the mutual relationship of the parts.

I claim as my invention:—

1. A ground wheel comprising a rotatable rim and a stationary band exterior thereto.

2. A ground wheel comprising a sectional rotatable rim and a stationary supporting band exterior thereto.

3. In combination in a ground wheel, a rotatable rim, a stationary supporting band exterior thereto, and balls interposed between said band and rim.

4. A wheel comprising a rim provided with a race and a tire-channel in its periphery, a supporting-band exterior to said rim and provided with an interior race, friction-reducing means disposed in said races, and a tire disposed in said channel.

5. A wheel comprising a rim provided with a race and a tire-channel at each side thereof, said race and channels disposed in the periphery of said rim, a supporting-band exterior to said rim and provided with an interior race, friction-reducing means disposed in said races, and tires disposed in said channels.

6. A ground-wheel comprising an annular rim provided with a peripheral race, there being shoulders rising therefrom at each side thereof, a stationary supporting band disposed between said shoulders, and friction-reducing means disposed in said race between said rim and band.

In witness whereof I hereunto subscribe my name this 11th day of May, 1910, at Galesburg, Illinois.

JOSEPH. W. HOLMES.

Witnesses:
WEBB A. HERLOCKER,
H. M. RICHARDS.